United States Patent [19]

Knapp

[11] 3,997,975
[45] Dec. 21, 1976

[54] CALIBRATION OF A MERIDIAN SEEKING INSTRUMENT

[75] Inventor: Ralph E. Knapp, Canoga Park, Calif.

[73] Assignee: Lear Siegler, Inc., Santa Monica, Calif.

[22] Filed: May 22, 1972

[21] Appl. No.: 255,563

Related U.S. Application Data

[63] Continuation of Ser. No. 887,507, Dec. 23, 1969, abandoned.

[52] U.S. Cl. .................................. 33/324; 33/326; 318/648; 318/689
[51] Int. Cl.² .................. G01C 19/38; B64C 17/02; G05B 17/00
[58] Field of Search ............. 33/324, 326; 318/648, 318/649, 659, 689, 632, 633; 73/1 D, 1 E; 177/210

[56] References Cited
UNITED STATES PATENTS

| | | | |
|---|---|---|---|
| 2,972,195 | 2/1961 | Campbell et al. | 33/324 |
| 3,512,264 | 5/1970 | Ambrosini | 33/324 |

*Primary Examiner*—Richard E. Aegerter
*Assistant Examiner*—Steven L. Stephan
*Attorney, Agent, or Firm*—Jackson & Jones Law Corporation

[57] ABSTRACT

A calibration system produces a calibrating signal having an adjustable amplitude, a torque force representative of that amplitude is directly applied to a meridian seeking gyroscope unit that hangs from a suspension band. Prior to each use of the instrument, the signal amplitude is adjusted so the gyroscope unit assumes a predetermined null position. The torque force is applied to the gyroscope unit by inductive field interaction of the first, second, and third coils. A control signal representative of the displacement of the gyroscope unit from the null position is applied to the third coil, which is fixed relative to the null position. The calibrating signal is applied to the first coil, which is also fixed relative to the null position. The axis of the first and third coils are both in an approximately perpendicular relationship to a vertical axis. A reference current is applied to the second coil, whose axis is fixed to the gyroscope unit in approximately a perpendicular relationship to the axis of the first and third coils. The amplitude of the calibrating signal is adjusted until the current applied to the third coil to produce an inductive field coil is reduced substantially to zero, at which time the instrument is calibrated.

13 Claims, 3 Drawing Figures

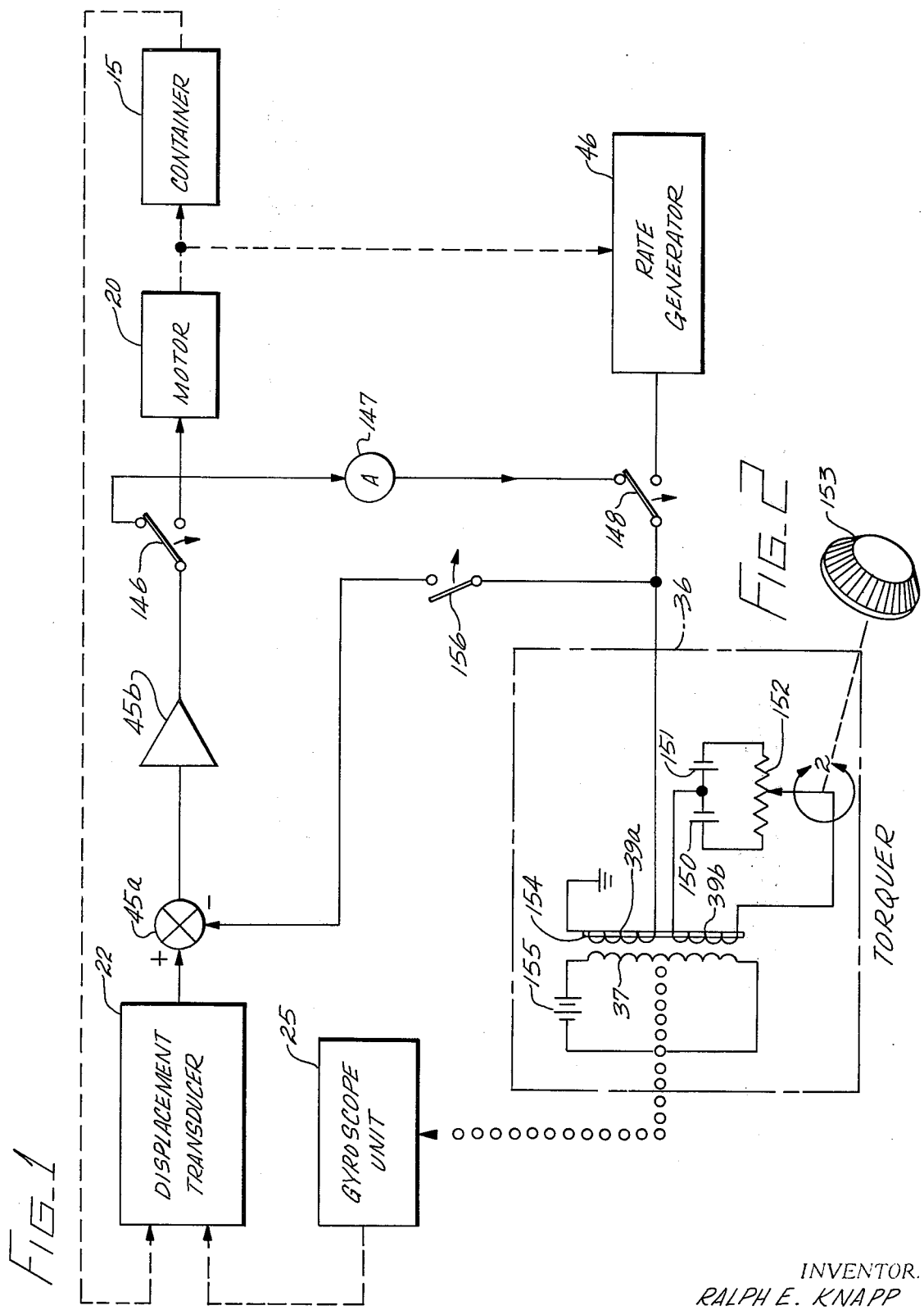

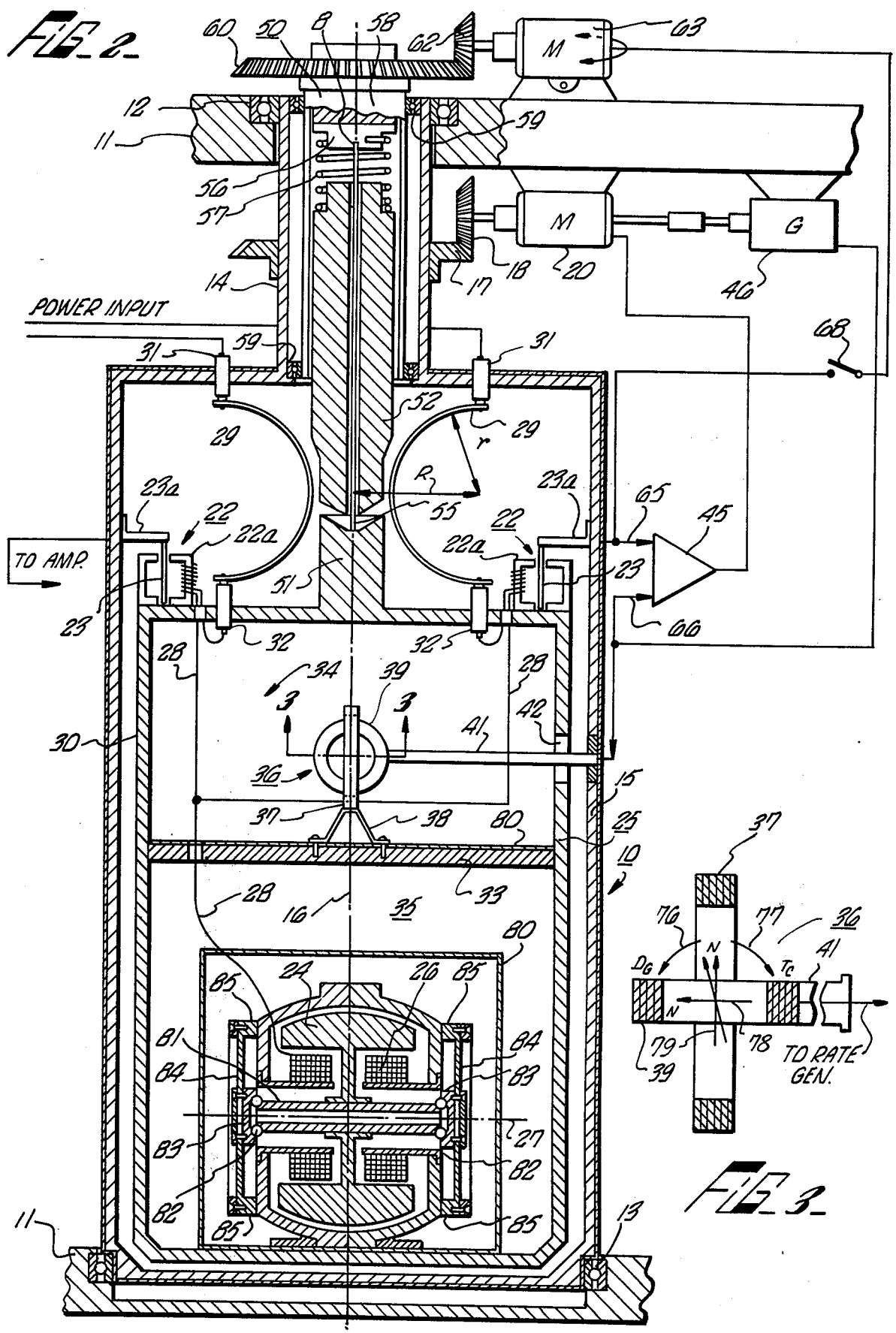

CALIBRATION OF A MERIDIAN SEEKING INSTRUMENT

CROSS REFERENCE TO RELATED APPLICATIONS

This is a continuing application of copending application Ser. No. 887,507, filed 12/23/69, and now abandoned, owned by the assignee of this application. This invention is related to commonly owned U.S. Pat. No. 3,512,264 of Leonard R. Ambrosini, issued May 19, 1970, the disclosure of which is incorporated herein by reference.

BACKGROUND OF THE INVENTION

This invention relates to meridian seeking instruments and, more particularly, to the calibration of such instruments.

Eklund U.S. Pat. No. 26,370 which issued Apr. 9, 1968, discloses a meridian seeking instrument that comprises a gyroscope unit having a horizontal spin axis and a container that encloses the gyroscope unit. The gyroscope unit hangs from a suspension band in the container, which is supported so it can rotate about a vertical axis. As the gyroscope unit rotates about the vertical axis under the influence of the earth's spin, the container is driven by a servo system so it follows the gyroscope unit, thereby reducing the twist in the suspension band. The container follow-up servo system comprises a transducer for generating a control signal representative of an angular displacement between the gyroscope unit and the container about the vertical axis, a motor for rotating the container, and a high gain amplifier for coupling the control signal to the input of the motor. The horizontal spin axis of the gyroscope unit oscillates symetrically about the meridian without appreciable damping. The true indication of the meridian is derived by bisecting the angle formed by the maximum excursions of the horizontal spin axis of the gyroscope unit as it oscillates.

The cross referenced Ambrosini patent discloses an arrangement in which the oscillations of the gyroscope unit about the vertical axis are damped by a torque force that is applied via a pair of coils to the gyroscope unit responsive to the previously mentioned control signal. Consequently, the horizontal spin axis of the gyroscope unit comes to rest in alignment with the meridian within a short period of time, e.g. five to ten minutes from initiation of gyro compassing. The torque force is applied to the gyroscope unit by a torquer comprising a first coil fixed to the container in approximately perpendicular relationship to the vertical axis and a second coil fixed to the gyroscope unit in approximately perpendicular relationship to the vertical axis and the first coil. The control signal or a secondary signal derived therefrom is applied to the first coil and a reference current is applied to the second coil. As a result, a torque force that is representative of the displacement between the gyroscope unit and the container is exerted on the second coil and transmitted thereby to the gyroscope unit to damp its oscillations.

The accuracy, or more properly, the repeatability of a meridian seeking gyroscope that hangs from a suspension band is impaired by the static error torques to which the gyroscope unit is subjected over a period of time. As used in this specification, the term "static error torques" refers to effects that change the angular position of the gyroscope unit about the vertical axis when its rotor is at rest. These effects act sufficiently slowly to be negligible in the course of taking a single fix, but are appreciable in the time interval between fixes. The sources of static error torques are diverse in nature. The effects of temperature changes on the suspension band is one of the major sources. Other sources are hysteresis effects and the permanent deformation of the suspension band that takes place as the suspension band ages. Stray magnetic fields also exert an influence on the position of the gyroscope unit. In the past, the effect of static error torques on the reading of the instrument has been reduced by providing an upper suspension band clamp that is rotatable. Prior to use of the instrument, it is calibrated by rotating the upper band clamp until the gyroscope unit assumes a null position about the vertical axis. This mechanical calibrating scheme is time consuming, leads to other errors, such as dislevelment of the instrument, and fails to attain an acceptable degree of repeatability from fix to fix. In addition, the provision of an external manual adjustment capability at the upper band clamp appreciably increases the size, complexity, and cost of the instrument.

SUMMARY OF THE INVENTION

The invention contemplates the application of a precision torque force to the gyroscope unit with respect to the container in an instrument with a suspension to a calibrating signal having an adjustable characteristic. The applied torque is representative of the characteristic of the calibrating signal. Thus, static error torques are cancelled by adjusting the characteristic until the gyroscope unit assumes its null position prior to each use of the instrument.

Preferably, the adjustable characteristic of the calibrating signal is amplitude and the torque force is applied to the gyroscope unit by a first coil fixed relative to the null position and a second coil fixed to the gyroscope unit. The calibrating signal is applied to the first coil, which is in approximately a perpendicular relationship to the vertical axis about which the gyroscope unit rotates. A reference current is applied to the second coil, which is in approximately a perpendicular relationship to the vertical axis and the first coil. Consequently, a torque representative of the amplitude of the calibrating signal is exerted on the second soil and transmitted thereby to the gyroscope unit.

An important feature of the invention is an arrangement that enables the amplitude of the calibrating signal to be precisely adjusted to eliminate the effects of static error torques in a simple straight-forward manner. The arrangement includes a third coil fixed relative to the null position in approximately a perpendicular relationship to the vertical axis and the second coil, a displacement transducer for generating a control signal representative of the angular displacement of the gyroscope unit from the null position about the vertical axis, and a high gain amplifier for coupling the control signal to energize the third coil. The described components form a servo system in which a torque force is applied to the gyroscope unit to drive it essentially to its null position. The amplitude of the calibrating signal is then adjusted while the rotor of the gyroscope unit is at rest until the current applied to the third coil by the high gain amplifier is substantially zero. In effect, this procedure transfers to the first coil the torque-producing magnetic field originating with the third coil. Then, the servo system is disconnected.

The invention can be used to advantage with the meridian seeking instrument disclosed in the referenced application. Specifically, the same high gain amplifier that is used during the operation of the instrument, i.e. during a fix, to drive the motor that rotates the container can be used to apply the control signal to the third coil during calibration. Further, the same coils that are used during operation to apply a damping torque directly to the gyroscope unit can be used as the second and third coils that establish the desired amplitude of the calibrating signal during calibration. Mode switches are provided to change the interconnections between components to permit the described component sharing.

The invention not only enables much more precise calibration than has heretofore been obtainable, thereby substantially increasing the repeatability of the instrument, but also permits appreciably faster calibration at a lower cost and with calibrating equipment that is smaller and lighter in weight.

BRIEF DESCRIPTION OF THE DRAWINGS

The features of a specific embodiment of the best mode contemplated of carrying out the invention are illustrated in the following drawings in which FIG. 1 is a block schematic diagram of a north seeking instrument incorporating the principals of the invention;

FIG. 2 is a side elevation of a prior art meridian seeking instrument; and

FIG. 3 is a cross sectional view of the prior art torquer device.

DETAILED DESCRIPTION OF THE SPECIFIC EMBODIMENT

The disclosure of the cross-referenced Ambrosini patent is incorporated herein be reference.

Turning now to FIG. 2, a side elevation partially broken away of the prior art meridian-seeking instrument 10, is shown. Instrument 10 is encased by a case 11 mounted on a tripod. The tripod legs are fastened to case 11 along axes which intersect at the suspension point 8 for pendulous gyroscope unit 25 of FIG. 2. Any vibration which may shake instrument 10 does not move suspension point 8 from its initial position.

Case 11 is only partially shown in FIG. 2 having upper and lower bearings pairs 12 and 13 mounted in case 11 and coupled to a cylindrical outer container 15. These bearings are low friction, and in a well-known manner allow the outer contaner 15 to freely rotate about a centrally located vertical axis 16. Rotation of outer container 15 about vertical axis 16 may be achieved through the horizontal oriented bevel gear 17 which is coupled to the outer container 15, and which is engaged by a bevel gear 18 and motor 20.

Located within the outer container 15 is a pendulous gyroscope unit 25. This pendulous gyroscope unit 25 includes an encased stator 26 which spins a gyro wheel or rotor 24, at very high speeds about a horizontal spin axis 27. The electrical power to drive this gryo wheel 24 is supplied by power leads 28 connecting stator 26 to a pair of curved power bands 29 through insulated terminals 32 mounted in openings located in the top of a cylindrical inner container 30. These curved power bands 29 are spring-load and are electrically connected at a second pair of insulated terminal posts 31 located in openings in the top of outer container 15.

Mounted on the top of the inner container 30 are a pair of pick-offs 22. Each pick-off consists of a double gap magnet 22a having a round, or square, coil 23 positioned in the air gap. Coil 23 is held in position in the air gap by a bracket 23a fastened to the inside of the outer container 15. The pick-offs 22 are wound with an energized coil in such a manner that if the sensing coil 23 deviates from the center of the gap of the magnet an electro-motive force is developed in the sensing coils 23 and a pick-off error signal is generated. An electrical connection is made between the coil 23 and amplifier 45 to apply this error signal to amplifier 45. Only one pick-off, of course, would be sufficient; however, two are used to provide greater magnitude of signal and to maintain accurate balance for the suspension system of gyroscope unit 25.

Inner container 30 of gyroscope 25 is divided into upper and lower chambers 34 and 35 respectively by a cylindrical partition wall 33. These two chambers are designated as the rotor chamber 35 and the torquer chamber 34. These chambers, and container 15 as well, may be filled with any suitable gas. A torquer 36, located in the torquer chamber 34, is mounted with an outer annular coil ring 37 fixedly fastened by bracket 38 to partition wall 33. Within the opening in the annular coil 37 is a similar annular coil 39, which has its vertical plane transversely oriented to the vertical plane of annular coil 37. This inner annular coil 39 has an outer diameter slightly less than the inner diameter of the annular coil 37 and thus is free to move relative to coil 37. Coil 39 is permanently mounted by a bracket 41 to the inside surface of the outer container 15. Bracket 41 has an opening extending through its length for housing electrical leads between coil 39, amplifier 45, and rate generator 46. A suitable opening 42 is provided in the inner container 30 so that the bracket 41 is allowed freedom of angular movement about the vertical axis 16 when there is relative movement between the inner and outer containers 30 and 15 respectively.

As shown in FIG. 2 the pendulous gyroscope unit 25 is in an uncaged position in that the caging piston 52 is not in contact with the similarly shaped caging seat 51 located at the top, and forming part of, the inner container 30.

A thin suspension band 55 is fastened to the caging seat 51 at one end, and at the other end band 55 is appropriately fastened to a suspension point disk 56 supported on a cylindrical spring 57. A longitudinal opening for suspension band 55 is provided along the length of piston 52 in the caging mechanism 50. This piston 52 is provided at its upper end with an offset shoulder, as is suspension point disk 56, so as to securely seat spring 57. Surrounding disk 56, spring 57, and piston 52 is a cylindrical piston chamber 58 which is mounted on bearings 59 for rotational movement about the vertical axis 16 relative to the inner wall of neck 14 of outer container 15. Piston 52 is allowed vertical movement within chamber 58 in response to any suitable lever or solenoid operation not shown but as is well known. Piston chamber 58, FIG. 2, extends through an opening in neck 14 of outer container 15, and a second horizontally oriented bevel gear 60 is suitably fastened to piston chamber 58. Gear 60 is engaged with a bevel gear 62 that in turn is driven by a motor 63.

Amplifier 45 may be any suitable high impedance input amplifier. Inputs 65 and 66 are provided for amplifier 45. Input 65 applies the pick-off signals to amplifier 45 and input 66 applies the output from rate generator 46 to amplifier 45. Rate generator 46 is mechanically coupled to the servo motor 20. The pick-off error signals are also applied through a manually operative calibrate switch 68 to calibrate motor 63.

When gyroscope 25, FIG. 2, is uncased, the gyroscope spin axis 27 commences to precess about the vertical axis 16. This precessing or rotational movement twists the suspension band 55 a small amount. In its initial condition the pick-off coils 23 were positioned in the center of the electromagnets 22a and thus no signal is intially developed by the pick-offs 22. Precessing movement of the gyroscope 25, however, displaces the pick-off coils 23 slightly with respect to their initial position in the electromagnets 22a and an error signal is generated in coils 23. This error signal is proportional to the angular displacement between the outer container 15 and the inner container 30. This error signal is applied to lead 65 which is one input for amplifier 45. The amplified signal from amplifier 45, in turn, drives the servo motor 20 which motor creates a torque that is sufficient to drive the outer container 15 into substantial alignment with the inner container 30.

This technique thus provides a follow-up system in that the outer container 15 is constrained to follow the movements of the inner container 30. Of course, the movements of the inner container 30 are in turn caused by the precessing movements of the pendulous gyroscope unit 25 in its attempts to seek out the true north/south meridian. Accordingly, the outer container 15 follows the movement of the spin axis 27 of the gyroscope unit 25 as it moves about the vertical axis 16. Connected to motor 20 is a rate generator 46 of any type well known in the art. This rate generator 46 is driven by the electrical motor 20 and produces an electrical output signal which is proportional to the speed, or rate, of rotation of the motor 20. This electrical output from the rate generator 46 is in turn applied to the torquer unit 36 which is located in torquer compartment 34 of the pendulous gyroscope unit 25.

Reference to FIG. 3 shows a horizontal cross-section of torquer 36. In FIG. 3 arrow 76 is labeled $D_g$ represents the angular displacement of the gyroscope unit 25 as the gyroscope spin axis 27 moves toward the north-south meridian. The output of the rate generator 46 delivers an electrical signal to the torquer 36 which produces a torque on the inner container 30 which opposes the angular displacement $D_g$. This countertorque is shown by arrow 77 which is labeled $T_c$. The manner in which this countertorque $T_c$ is produced is depicted in FIG. 3, wherein annular magnetic coils 37 and 39 are shown in cross-section and transversely oriented with respect to each other. Annular coil 37 is mounted on the partition wall 33 and thus is permanently fixed with respect to the inner container 30. The magnetic field established by coil 37 is shown by arrow 78. It should be understood that this magnetic field may be caused either by direct or alternating current in coil 37, depending upon the power input source. In any event, however, at any given moment of time the magnetic field 78 established by coil 37 may be approximately in the direction shown. Coil 39 which is permanently fixed by bracket 41 to the outer container 15 yields a field which at any same given moment is in the direction shown by arrow 79. Coils 37 and 39 are thus wound so that the north and south poles of the magnetic fields 78 and 79 are 90° apart. A movement of the gyroscope unit 25 in the direction shown by torque arrow 76 tends to move the magnetic field 78 into the counterclockwise position shown in FIG. 3. The output signal from rate generator 46 is applied of proper phase (AC) or polarity (DC) to coil 39 so as normally to increase the strength of the transverse magnetic field 79. Inasmuch as like magnetic poles tend to repel each other, this increased strength opposes the movement of coil 37 and because of the interrelationship between the two coils establishes a countertorque $T_c$ is continually being applied to oppose the annular displacement $D_g$ of the gyroscope unit 25 as it seeks out the true north/south meridian.

Referring to FIG. 1 disclosing the present invention, the solid lines connecting the blocks in the drawing represent the coupling of electrical signals, the dashed lines represent the coupling of angular displacement, and the dotted line represents the coupling of torque. The angular displacement of container 15 and gyroscope unit 25 about the vertical axis of the instrument is coupled to displacement transducer 22. Thus, displacement transducer 22 generates an electrical control signal representative of the angular displacement between gyroscope unit 25 and container 15 from a null position. The output of transducer 22 is electrically coupled to one input of a summing junction 45a. The output of summing junction 45a is electrically coupled through a high gain amplifier 45b, one contact of a switch 146, an ammeter 147, and one contact of a switch 148 to a coil 39a of torquer 36. In the cross-referenced patent, as shown in FIG. 2, summing junction 45a and amplifier 45b are represented by a single element 45.

A batter 150, a battery 151 and a potentiometer 152 are connected in series in a closed loop. A coil 39b of torquer 36 is connected between the junction of batteries 150 and 151 and the movable contact arm of potentiometer 152. The position of the contact arm of the potentiometer 152 is adjusted by rotating a knob 153. Coils 39a and 39b are fixed to container 15 in approximately axial alignment with each other and in approximately perpendicular relationship to the vertical axis. Coils 39a and 39b are both wrapped around a slug 154 of magnetic material. Coils 39a and 39b are supported and positioned in the instrument in the same manner as coil 39 in FIG. 2. Coil 37 of torquer 36 is fixed to the gyroscope unit in approximately perpendicular relationship to the vertical axis and coils 39a and 39b. Coil 37 is connected across the terminals of a battery 155, which supplies a reference current thereto. The dotted line from coil 37 to the gyroscope unit 25 signifies that the torque exerted on coil 37 is transmitted thereby to gyroscope unit 25.

While the instrument is being calibrated, switches 146 and 148 and a switch 156 are in the position shown in the drawing and the rotor of gyroscope unit 25 is at rest. Transducer 22, high gain amplifier 45b, coil 39a, and coil 37 form a servo system that tends to damp the oscillation of gyroscope unit 25 and reduce the control signal generated by transducer 22 toward zero. As a result, a torque force is applied to gyroscope unit 25 to drive it toward its null position relative to container 15. The term "null position" means the predetermined position of gyroscope unit 25 about the vertical axis relative to container 15 in which the control signal from transducer 22 is zero. Assuming there are in fact present static error torques that cause a correcting torque force to be applied to gyroscope unit 25 responsive to the servo system, ammeter 147 registers a current indicative of this correcting torque force. The instrument is then calibrated by turning knob 153 until ammeter 147 registers substantially zero current, at which time the entire magnetic field that causes the applied correcting torque force to gyroscope unit 25 is being furnished by coil 39b. In effect, the adjustment of knob 153 in the described manner transfers from coil 39a to coil 39b the magnetic field that produces the correcting torque force at coil 37. Prior to the transfer, the servo system quickly drives gyroscope unit 25 to its null position in a highly damped manner. During the transfer, gyroscope unit 25 remains at the null position, and after the transfer the correcting torque force is stored so to speak by potentiometer 152. Thus, the instrument is quickly and accurately calibrated because uncontrolled oscillations of gyroscope unit 25 are precluded during calibration.

After the instrument is calibrated, switches 146, 148, and 156 are placed in the positions indicated by the arrows for operation of the instrument. In other words, the lower contacts of switches 146 and 148 are closed and switch 156 is closed. As a result, the output of amplifier 45b is electrically coupled to the input of motor 20. The output shaft of motor 20 is mechanically coupled to container 15, which is rotatably supported about the vertical axis, and to rate generator 46. Rate generator 46 produces an electrical signal that is representative of the rate of change of angular displacement of the output shaft of motor 20. The output of rate generator 46 is electrically coupled through switches 148 and 156 to the other input of summing junction 45a, where it is differentially combined with the output of transducer 22 as depicted by the mathematical signs in the drawing. The control signal generated by transducer 22 drives container 15 through motor 20 so that the angular displacement between gyroscope unit 25 and container 15 is reduced toward zero. As a result, container 15 follows gyroscope unit 25 as it rotates about the vertical axis under the influence of the earth's spin, thereby reducing the twist in the suspension band. The output of rate generator 46 serves as a damping component for this follow-up servo system. It is to be noted that displacement transducer 22 and amplifier 45b play a part in both the calibration and the operation of the instrument.

Motor 20 inherently functions as in integrator, i.e., the position of its output shaft is representative of the integral of the electrical signal applied to its input. Motor 20, as all motors, also has a treshold below which it does not respond, i.e., if the signal applied to its input is below a predetermined threshold level, the position of its output shaft remains stationary. Assuming that the signal applied to the input of motor 20 is about the threshold level, the output of rate generator 46 is proportional to the control signal generated by transducer 22 because this control signal is in essence first integrated and then differentiated. The output of rate generator 46 is also applied to coil 39a through switch 148. As a result, a torque force proportional to the output of rate generator 46 is directly applied to gyroscope unit 25 about the vertical axis. This applied torque force opposes the angular displacement between gyroscope unit 25 and container 15 from the null position and tends to rotate gyroscope unit 25 to reduce this angular displacement and thereby dampen the oscillations of the gyroscope unit. It is to be noted that coil 39a plays a part in both the calibration and the operation of the instrument. During calibration, it serves initially to establish an applied torque force to gyroscope unit 25, which is then transferred to coil 39b during the operation of the instrument. During operation, coil 39a produces a damping torque force that is applied to gyroscope unit 25 along with the calibrating torque force produced by coil 39b.

Although it is most convenient to adjust the amplitude of the calibrating signal responsive to knob 153, it is conceivable that other characteristics of the calibrating signal, such as frequency, phase, peak amplitude, etc., could be adjusted. Similarly, although it is particularly advantageous to utilize the invention with a container follow-up servo system and a torque damping arrangement, as disclosed in the specific embodiment, the invention could be used to calibrate other types of meridian seeking instruments in which the gyroscope unit is supported so that it is able to rotate about a vertical axis.

To summarize, the calibration of a meridian seeking instrument by means of the invention, gyroscope unit 25 is first uncaged while its rotor is at rest and switches 146, 148 and 156 are each in the position shown in the drawing. Thus, the servo system comprising transducer 22, high gain amplifier 45b, coil 39a and coil 37 drives gyroscope unit 25 toward its null position to eliminate substantially the effect of the static error torques. Second, knob 153 is adjusted until ammeter 147 registers zero current, thereby transferring the magnetic field of coil 39a to coil 39b. Third, gyroscope unit 25 is caged and power is applied to bring its rotor up to operating speed. Fourth, gyroscope unit 25 is uncaged after its rotor has reached operating speed. Switches 146 and 148 are each placed in the other position, and switch 156 is closed. Finally, the orientation of gyroscope unit 25 in the horizontal plane is sensed after it settles on the meridian.

What is claimed is:
1. A calibration system for eliminating the effects of static error which move a pendulously supported two-degree-of-freedom meridan seeking gyroscope from a predetermined null position relative to a gyroscope container, the instrument including a gyroscope unit having a rotor adapted for rotation about a horizontal spin axis that tends to align itself with the meridian when the unit is pendulously supported for two degree freedom of movement by a suspension band and further including means rotatably mounting the container on a frame for rotation about a vertical axis, which container surrounds the suspended gyroscope unit and also includes a pick-off for generating an electrical signal which is representative of an angular displacement relative to said null position between the gyroscope unit and the container, said calibration system comprising:

first magnetic means fixed to gyroscope unit for supplying a first reference magnetic field perpendicular to the vertical axis;
second magnetic means fixed to the container and interspaced in non-touching relationship from the first magnetic means for supplying a second magnetic field perpendicular to the vertical axis and inductively coupled in substantially perpendicular direction with the first reference magnetic field when there is no angular displacement of the gyroscope unit away from said null position;
means responsive to said angular displacement signal when said rotor is at rest for establishing a variable intensity in said second magnetic field which develops a torque when the gyroscope is displaced from the null position tending to move the gyroscope unit back to said null position;

third magnetic means also interspaced in nontouching relationship with said first magnetic means for supplying a variable intensity third magnetic field substantially aligned with and magnetically interacting with said second magnetic field;

means varying the intensity of said third magnetic field when said rotor is at rest so that the third magnetic field develops a torque for holding the gyroscope unit at its null position when the second magnetic field is reduced to zero; and means responsive to said angular displacement signal when said rotor is spinning for establishing a damping torque magnetic field in said second magnetic means as the spin axis of the rotor seeks out the meridian.

2. A calibration system in accordance with claim 1 wherein said means for varying the intensity of said third magnetic field comprises:

a signal source, an adjustable potentiometer connected to said signal source, and means for applying an output signal from said source to said third magnetic means.

3. a calibration system in accordance with claim 1 wherein the interspaced magnetic means are a pair of physically spaced toroidal windings with one toroidal winding located within the other.

4. a calibration system in accordance with claim 3 wherein the second and third magnetic means comprise a pair of windings around a slug of magnetic material.

5. A calibration system in accordance with claim 3 and further comprising means for mounting the first toroidal winding of said pair with an axis through its center parallel to the spin axis of the gyroscope rotor, and means for mounting the second toroidal winding of said pair with its center axis transverse to the other center axis.

6. A calibration system in accordance with claim 5 wherein the second toroidal winding includes a pair of windings which supply the second and third magnetic fields.

7. A calibration system in accordance with claim 1 and further comprising a meter connected in series with the second magnetic means and the means for generating an angular displacement signal.

8. A calibration system in accordance with claim 7 where the means for generating an electrical signal representative of angular displacement includes a displacement transducer and a high gain amplifier.

9. A calibration system as in claim 8 where the meridian seeking instrument further includes a motor connected to the container for rotation of the container and for rotation of a rate generator, and a first switch means for connecting the output of the high gain amplifier to either the motor or the second magnetic means and a second switch means for connecting either the output of the high gain amplifier or the rate generator to the second magnetic means.

10. A calibration system for eliminating the effects of static error torques which move a pendulously supported two-degree-of-freedom meridian seeking gyroscope from a predetermined null position relative to a gyroscope container, the instrument including a gyroscope unit that is pendulously supported for two degree freedom of movement by a suspension band aligned in a vertical axis and further including an outer container on a frame, which container surrounds the suspended gyroscope unit and also includes a pick-off for generating an electrical signal which is representative of a static angular displacement relative to said null position between the gyroscope unit and the container, said calibration system comprising:

first magnetic means fixed to the gyroscope unit for supplying a first reference magnetic field perpendicular to the vertical axis;

second magnetic means fixed to the container and when energized supplying a second magnetic field perpendicular to the vertical axis and only coupled inductively to the first reference magnetic field, said first and second fields being so aligned that the fields are substantially perpendicular to one another when there is no angular displacement of the gyroscope unit away from said null position;

means responsive to said angular displacement signal for energizing said second magnetic means and establishing a variable intensity in said second magnetic field which develops a torque when the gyroscope is displaced from the null position tending to move the gyroscope unit back to said null position;

third magnetic means electrically separate from said second magnetic means for supplying a variable intensity third magnetic field substantially aligned with and magnetically interacting with said second magnetic field; and means varying the intensity of said third magnetic field so that the third magnetic field develops a torque for holding the gyroscope unit at its null position when the second magnetic field is reduced to zero.

11. A calibration system for eliminating the effectes of static error torques which move a pendulously supported two-degree-of-freedom meridian seeking gyroscope from a predetermined null position relative to a gyroscope container, the instrument including a gyroscope rotor that is pendulously supported for two degree freedon of movement by a suspension band aligned in a vertical axis and further including an outer container on a frame, which container surrounds the suspended gyroscope rotor and also includes a pick-off for generating an electrical signal which is representative of a static angular displacement relative to said null position between the gyroscope rotor and the container, said calibration system comprising:

first magnetic means fixed relative to the gyroscope rotor for supplying a first reference magnetic field perpendicular to the vertical axis;

second magnetic means fixed to the container, and when energized, supplying a second magnetic field perpendicular to the vertical axis and only coupled inductively to the first reference magnetic field, said first and second fields being so aligned that the fields are substantially perpendicular to one another when there is no angular displacement of the gyroscope rotor away from said null position;

means responsive to said angular displacement signal for energizing said second magnetic means and establishing a variable intensity in said second magnetic field which develops a torque, when the gyroscope rotor is at rest and is displaced from the null position, tending to move the gyroscope rotor back to said null position;

third magnetic means electrically separate from said second magnetic means for supplying a variable intensity third magnetic field substantially aligned with and magnetically interacting with said second magnetic field; and means varying the intensity of said third magnetic field so that the third magnetic field develops a torque for holding the gyroscope rotor at its null position when the second magnetic field is reduced to zero.

12. a calibration system according to claim 11 and further comprising:

means responsive to said angular displacement signal when said gyroscope rotor is spinning for establishing a variable intensity in said second magnetic field to develop a damping torque as said spin axis of said rotor seeks out the meridian.

13. A calibration system for eliminating the effects of static error torques which move a pendulously supported two-degree-of-freedom meridian seeking gyroscope from a predetermined null position relative to a gyroscope container, the instrument including a gyroscope unit which is pendulously supported for two degree freedom of movement by a suspension band aligned in a vertical axis and further includes an outer container which surrounds the suspended gyroscope unit together with an associated pick-off means for generating an electrical signal which is representative of angular displacement between the gyroscope unit and the container, said calibration system comprising:

first and second magnetic means interspaced in non-touching relationship with one another and comprising first and second toroidal windings with the second winding located within the first winding and having axes through the center of each toroidal winding which axes lie in a common plane that is parallel to the spin axis of the gyroscope rotor and transverse to said vertical axis;

means mounting said first toroidal winding in a position for supplying a first reference magnetic field perpendicular to the vertical axis;

means mounting said second toroidal winding to the container such that said second winding when energized supplies a second magnetic field perpendicular to the vertical axis and inductively coupled in substantially perpendicular direction with the first reference magnetic field when there is no angular displacement of the gyroscope unit away from said null position;

means responsive to said angular displacement signal when said gyroscope rotor is at rest for energizing said second toroidal winding to establish a variable intensity in said second magnetic field to develop a torque when the gyroscope is displaced from the null position which torque tends to move the gyroscope back to its null position;

a third magnetic winding coaxial with said second toroidal winding for supplying a variable intensity third magnetic field substantially aligned with and magnetically interacting with said second magnetic field; and means varying the intensity of said third magnetic field while said rotor is at rest so that the third magnetic field develops a torque for holding the gyroscope unit to its null position when the second magnetic field is reduced to zero.

* * * * *